G. E. RIGBY.
MOTORCYCLE.
APPLICATION FILED JUNE 11, 1918.

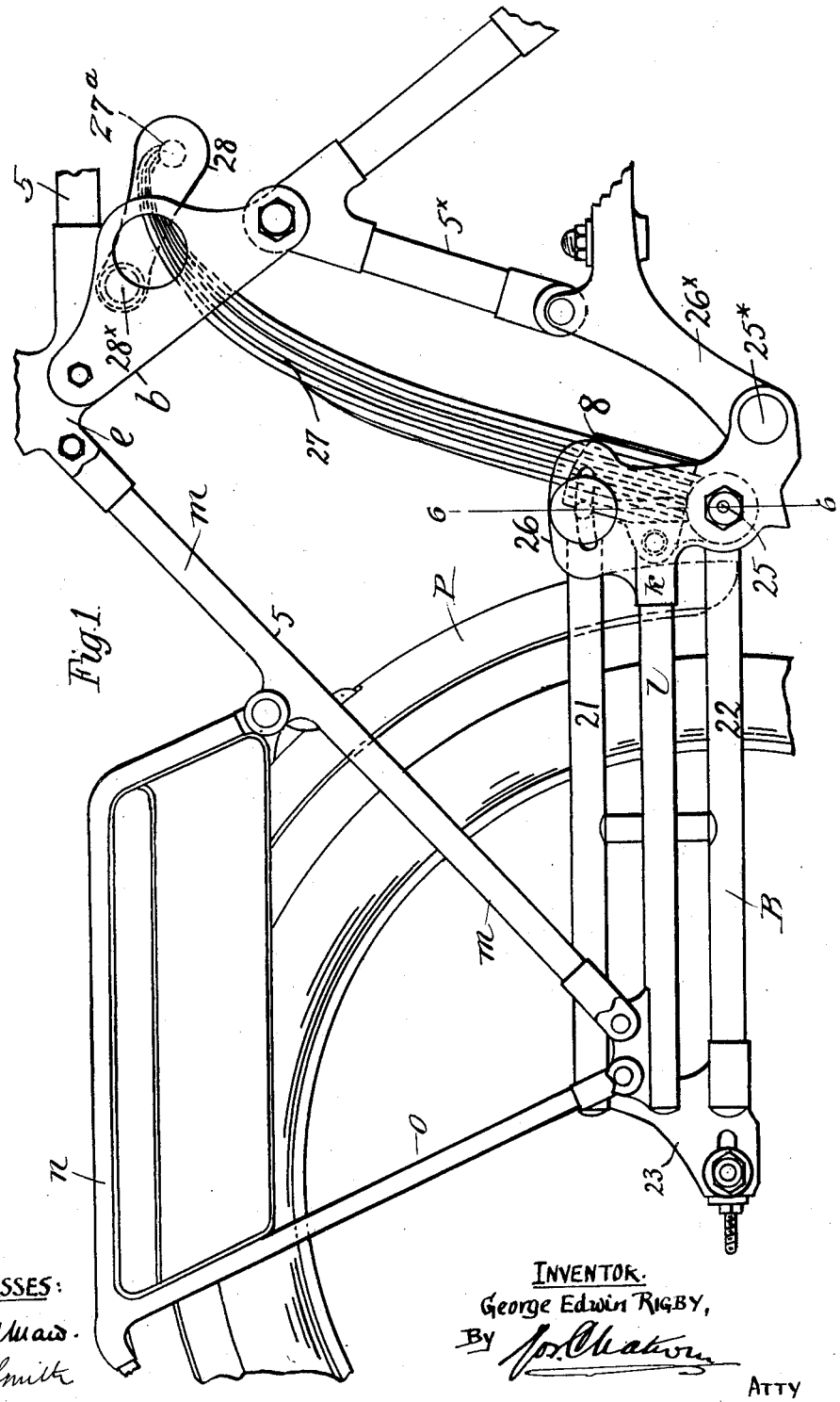

1,369,356.

Patented Feb. 22, 1921.
4 SHEETS—SHEET 2.

WITNESSES:
Edward Mann
John Smith

INVENTOR:
George Edwin Rigby
BY
ATTY.

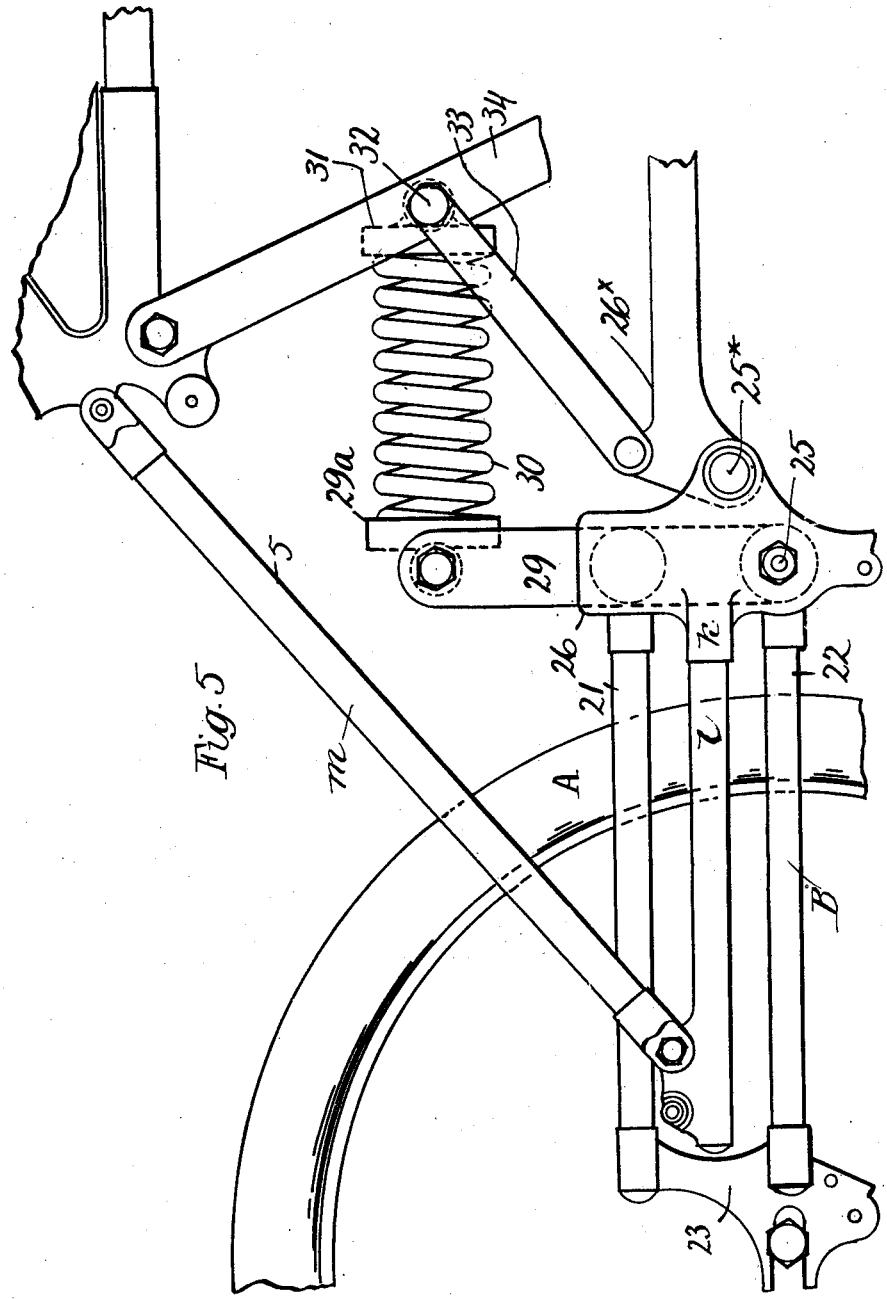

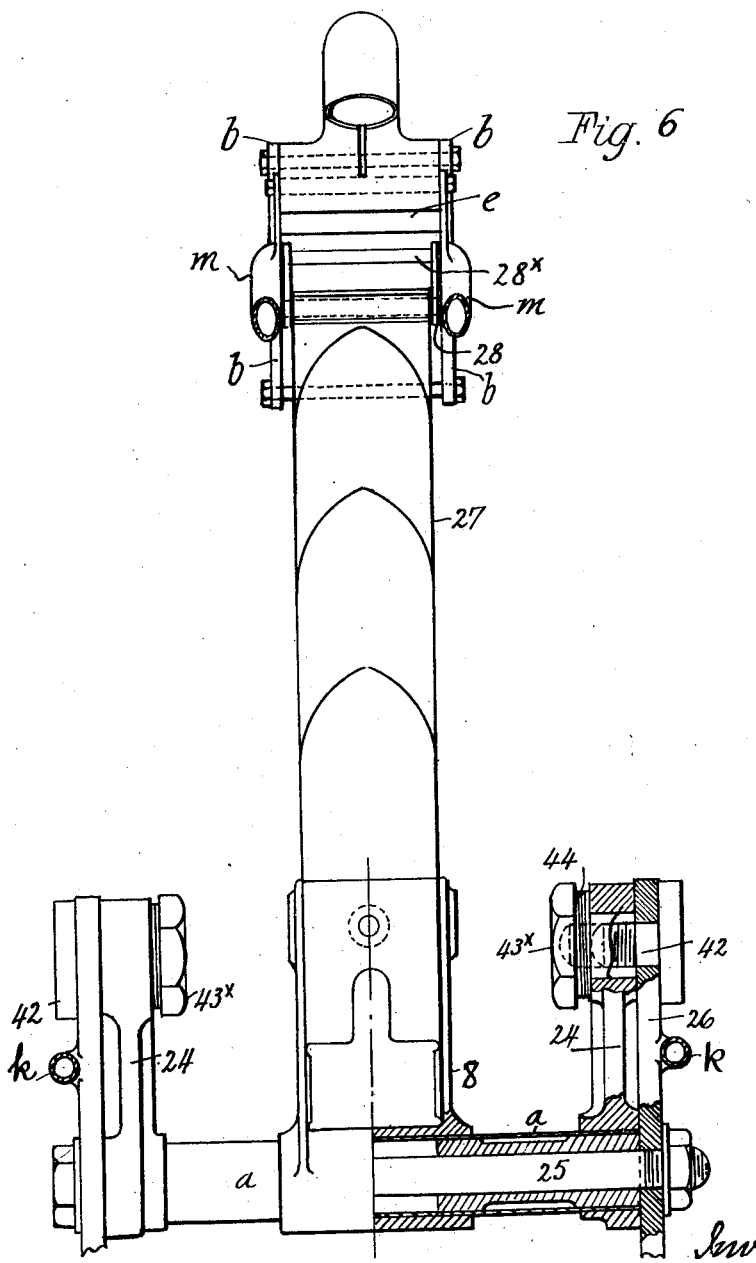

UNITED STATES PATENT OFFICE.

GEORGE EDWIN RIGBY, OF MANCHESTER, ENGLAND.

MOTORCYCLE.

1,369,356.     Specification of Letters Patent.     Patented Feb. 22, 1921.

Application filed June 11, 1918. Serial No. 239,365.

*To all whom it may concern:*

Be it known that I, GEORGE EDWIN RIGBY, a subject of the King of England, residing at Manchester, in the Kingdom of England, have invented new and useful Improvements in Motorcycles, of which the following is a specification.

My invention relates to improved means for preventing vibration on the main frame of a motorcycle carrying the engine and adjacent parts, of the kind which carries the roadwheel in a separate or detachable frame, and it consists in duplicate rear frame members rigidly connected together at their ends, said frame being connected to an oscillating transverse member which operates a spring and is pivotally connected to side plates or members attached to the main frame.

My improvements reside particularly in the construction and operation of the separate detachable frame carrying the rear wheel, the disposition of the spring or springs in the central plane of said rear frame, the spring being provided with a housing or control arm rigidly mounted on the transverse member connecting the two pairs of rear frame members and which acts as a bearing for the frame.

My improvements also embrace the construction and arrangement of the side plates.

I provide a strong separate detachable frame or unit approximately of rectangular shape for carrying the rear roadwheel, comprising a double set of horizontal frame members which serve as chain or belt stays, the double set of frame members being connected together at their forward ends by a transverse member which forms a bearing for the spindle on which the duplicate rear frame pivots. On this transverse member is mounted a housing or control arm for the spring. The duplicate rear frame is moreover provided with pins to rock in slots provided in side plates secured to the gear bracket or other suitable part of the rigid frame.

The roadwheel is carried by the rear end of the duplicate rear frame or longitudinal rear stays at their ends. The forward end of the frame is formed by the transverse bearing member on which the controlling means for the spring are mounted, of which latter there may be one or more laminated, tension or compression springs.

In order that my invention may be clearly understood and carried into effect, I will describe the same fully with reference to the accompanying drawings, in which:—

Figure 1 shows the general arrangement of the device in front elevation, as applied to the rear portion of a motorcycle;

Fig. 5 is a view corresponding to Fig. 4 but showing a compression spring; and

Fig. 6 is a transverse sectional view on line 6—6 of Fig. 1.

According to the present arrangement, 5 is the fixed frame of the motorcycle, 21—22 the separate or detachable frame or unit carrying the roadwheel A. This unit B comprises a double set of horizontal frame members 21—22 pivoted to side plates 26 secured to the gear bracket or other suitable part of the fixed frame 5. Each side frame member is formed by upper and lower rods 21—22 rigidly connected together at their ends, by the parts 23—24 so as to form a frame approximately rectangular in shape.

The two frame members B carry the roadwheel A at one end and at the other end are connected by a transverse member on which is mounted a rigid housing 8 for the spring so that the duplicate rear frame can operate said spring. The said transverse member acts as a bearing for the unit 21—22, being provided with a spindle 25.

Figure 4:
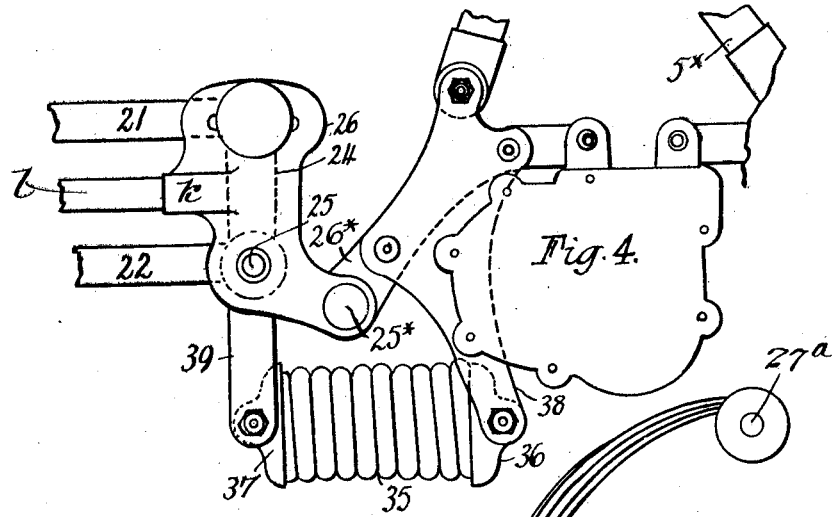
Fig. 4 shows the application of a tension spring in lieu of the laminated spring shown in Fig. 1.

In Fig. 4 I have adopted a tension spring 35 operated by the frame B, through a depending arm 39 while in Fig. 5, a compression spring 30 is employed and similarly operated through an upright arm 29.

The gear bracket 26ˣ which is connected to the middle section of the frame is provided with side plates 26 integral therewith to which the roadwheel unit B is pivoted, said side plates having lugs $k$ to receive the rear stays $l$ which support the seat tube $m$ carrier $n$ and carrier stay $o$. The rear stand is anchored to said side plates 26, but is not shown in the drawings for the sake of clearness.

Figure 2:
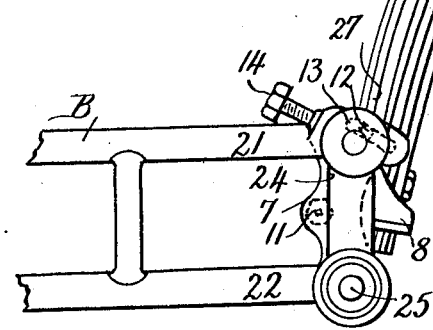
Fig. 2 shows the detachable or separate frame or unit carrying the roadwheel.
Figure 3:
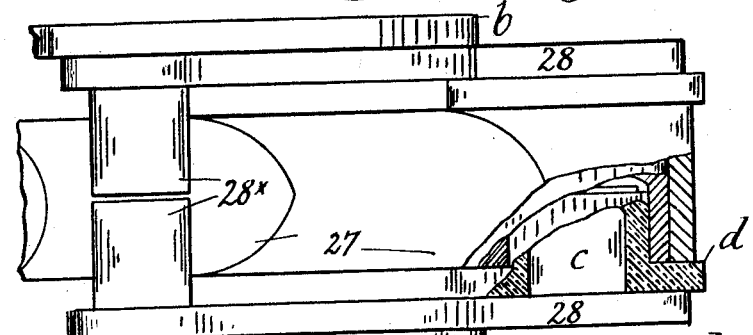
Fig. 3 shows an enlarged plan of a suitable spring bearing used in connection with the device.

In the case of the laminated spring 27 shown at Figs. 1 and 2, the eye-end $27^a$ thereof is preferably connected to a spring bearing such as is shown at Fig. 3, wherein spring links or side plates 28 are pivoted at 28× to a suitable part say *b* of the frame 5, as shown merely in outline in Fig. 1 and comprise bosses *c* for the eye of the spring integral with the links 28, 27 being the laminated spring, and *d* a bronze bush. Any other suitable bearing may, however, be adopted.

The other end of the laminated spring is secured in the housing 8; this housing may be in a form for providing adjustment for the spring and is fitted on the transverse member or bearing *a* on a spindle 25.

The object of the double rod 21—22 is to avoid lateral play which would occur if only one rod were used.

The action is as follows:—

First of all it will be observed that the middle section 5 and the gear brackets 26× are connected together, and the rear seat stays *m*, mudguard *p*, carrier *n* and stand (not shown) are attached thereto, forming the rigid frame which carries the engine gear-box, carrier, stand and mudguard and is designed and so constructed as to permit the frame 21—22 which carries the roadwheel A, to be detached as a separate unit, leaving all the other parts intact.

The joltings or vibrations of the wheel A are absorbed by the duplicate frame 21—22 which is integral with the centrally disposed housing 8 for the spring 27 or the arms 29 or 39 to which the springs 30 or 35 are secured.

The unit 21—22 has a transverse bearing *a*, pivoted on a spindle 25 held at either end in the side plate 26. Said unit has a pin or the like 12 which can oscillate in a slot 13, in the side plates 26 which are secured to the gear bracket 26× or to the rigid frame 5× and form part thereof.

The oscillations of unit B are transmitted to the housing 8 and thereby to the spring 27 which is connected at its other end to the frame 5× either directly or through shackles, or a spring bearing such as 27ª.

It will therefore be quite clear that the roadwheel A, unit B and spring 27 take up or absorb the whole of the vibrations and that the rigid frame 5× which is independent thereof receives no vibration at all.

In the case of the breakage of the spring 27, 30 or 35 or of a rod in the rear frame 21 or 22, I have devised a locking device whereby the unit 21—22 can be rigidly locked to the rigid frame 5× by merely tightening up a bolt or bolts 42, 43× with intervening spring washer 44, as described in my copending application, Serial No. 301,288 and in this manner the machine can still be used as a rigid machine until the necessary repairs can be effected.

I claim:—

1. Means for preventing vibration on the main frame of a motorcycle or the like comprising a separate or detachable frame or unit carrying the roadwheel and consisting in a double set of horizontal rear forks, each comprising a pair of spaced longitudinal members rigidly connected at the ends to form an approximately rectangular structure, the forward ends being in combination with a transverse bearing member, controlling means for a spring fitted thereon, laterally projecting pins or the like on said duplicate rear forks, and slotted side plates, attached to the rigid frame, in which the pins can rock.

2. Means for preventing vibration on the main frame of motorcycles consisting in the combination of practically rectangular frames of a horizontal rear fork, comprising rear connecting members, a roadwheel mounted in the latter, a front connecting transverse member, upright arms with lateral projecting pins carried by same, slotted side plates on the cycle frame to receive the pins of said arms and permit of rocking motion, a transverse journal for the front connecting member in the slotted side plates, rear stays fixed to the latter, connections for seat stays and carrier stays on said rear stays, and elastic connection between said transverse member and the main cycle frame.

GEORGE EDWIN RIGBY.